United States Patent [19]

Hofmann

[11] 3,909,522

[45] Sept. 30, 1975

[54] COINCIDENCE GATED AGC FOR A TELEVISION RECEIVER

[75] Inventor: Judson A. Hofmann, Schaumburg, Ill.

[73] Assignee: Zenith Radio Corporation, Chicago, Ill.

[22] Filed: June 4, 1973

[21] Appl. No.: 366,944

[52] U.S. Cl. .......... 178/7.3 R

[51] Int. Cl.² .......... H04N 5/52

[58] Field of Search ....... 178/7.3 R, 7.3 DC, 7.5 DC

[56] References Cited

UNITED STATES PATENTS

| | | | |
|---|---|---|---|
| 3,084,216 | 4/1963 | Tschannen | 178/7.3 DC |
| 3,251,938 | 5/1966 | Ruby | 178/7.3 DC |
| 3,256,502 | 6/1966 | Momberger | 178/7.3 DC |
| 3,344,232 | 9/1967 | Pollak | 178/7.3 DC |
| 3,624,290 | 11/1971 | Hofmann | 178/7.3 DC |

FOREIGN PATENTS OR APPLICATIONS

| | | | |
|---|---|---|---|
| 242,400 | 2/1960 | Australia | 178/7.3 R |

*Primary Examiner*—Robert L. Griffin
*Assistant Examiner*—George G. Stellar
*Attorney, Agent, or Firm*—Nicholas A. Camasto; Roy A. Ekstrand

[57] ABSTRACT

A television AGC has a differential amplifier comparator comprising a pair of transistors having their currents coupled to ground through a common sink transistor, the impedance of which is controlled by a coincidence circuit in response to receiver horizontal oscillator synchronization. In one of the disclosed embodiments, the coincidence circuit comprises a dual collector transistor coupled to a source of sync pulses. One collector supplies a large amplitude pulse to the sink transistor through an AND gate which is activated when the receiver is in sync. The other collector supplies a small amplitude pulse directly to the sink transistor bypassing the AND gate. In the other disclosed embodiment, the sync pulses are fed directly to the base of the sink transistor and its emitter is connected to ground through a resistor. The resistor is bypassed by the emitter-collector junction of a transistor which is switched into conduction by the retrace pulse.

8 Claims, 2 Drawing Figures

COINCIDENCE GATED AGC FOR A TELEVISION RECEIVER

RELATED PATENTS

This application is related to U.S. Pat. No. 3,624,290, issued Nov. 30, 1971, entitled TELEVISION RECEIVER AGC SYSTEM KEYED IN RESPONSE TO TIME COINCIDENCE OF SYNC AND FLYBACK PULSES and U.S. Pat. No. 3,806,646, issued Apr. 23, 1974, entitled NOISE PROCESSING SYSTEM AND METHOD FOR USE IN A TELEVISION RECEIVER, both in the name of Judson A. Hofmann and assigned to the assignee of the present application, which disclose separate and distinct inventions having preferred embodiments related to the present invention.

BACKGROUND OF THE INVENTION

This invention relates generally to television receivers and in particular to automatic gain control systems therefor.

Television receivers are required to process broadcast signals received at levels which may vary considerably. For example, it is not uncommon for the maximum signal level to be 100 times the minimum signal level. It is desirable, however, that a consistent level of detected signal information be available to the circuitry within the receiver in spite of these variations. Therefore, television receivers employ automatic gain control systems. The automatic gain control systems are generally closed loop control systems which maintain a desired detected signal level by altering the gains of the radio frequency and intermediate frequency amplifiers of the receiver in response to an internally generated control voltage.

The television signal is composed of picture information and reference information, the latter in the form of synchronizing pulses, modulated on a carrier. The picture information is displayed on an electron activated, light producing phosphor viewing screen of a picture tube by appropriate intensity modulation of an electron beam which is scanned in the horizontal and vertical directions by corresponding horizontal and vertical deflection systems in the receiver. Under normal "in-sync" conditions, the horizontal deflection system generates a scan signal during the period corresponding to the presence of picture information in the television signal and a retrace signal during the period corresponding to the presence of synchronizing pulse information. The latter period is often referred to as the sync pulse interval. The synchronizing pulses are used to control the scanning process and make it coincide with the occurrence of picture information in the received signal.

It is a characteristic of a television signal that the synchronizing pulses are also representative of carrier amplitude, i.e., signal level, whereas the video or picture information which varies in amplitude from light to dark scenes irrespective of carrier level is not a reliable indicator of television signal strength. Consequently, television receivers generally include circuitry to "key" (turn on) the automatic gain control system responsive to the retrace signal, thereby generating a control voltage only during the sync pulse interval. This insures that the AGC voltage will be responsive to carrier signal level and not video signal levels.

The above assumes that the receiver is in sync, that is, the retrace signals and the synchronizing pulses occur simultaneously. When synchronization is not present, the AGC system may be keyed on during intervals which do not correspond to the occurrence of synchronizing pulses, resulting in generation of an erroneous control voltage.

An improved AGC system is disclosed in the aforementioned U.S. Pat. No. 3,624,290. That system employs a "sample and hold" technique in which the AGC system is activated (keyed) only if the receiver is in sync; that is, when the sync pulse and horizontal retrace signal occur simultaneously. During periods when keying does not occur, the AGC system is not activated and the error voltage previously generated (during the last active period) is supplied to the receiver without change. Keying the AGC system only during in-sync conditions avoids the difficulties which arise due to generation of erroneous control voltages. Such systems are very stable and satisfactory during in-sync conditions, but occasionally exhibit slow horizontal pull-in characteristics. This occurs because to attain synchronization, the horizontal deflection system requires a supply of synchronizing pulses, which can only be provided by the sync separator if the signal is at the correct amplitude. However, during "out-of-sync" conditions, the AGC system is inactive and no correction for signal variations takes place and the supply of synchronizing pulses may be interrupted.

SUMMARY OF THE INVENTION

The present invention comprises a sample and hold television AGC system wherein a differential amplifier comparator detects variations in received signal strength by comparing the amplitude of detected sync pulses to a reference potential. A coincidence circuit, which determines in-sync conditions by sensing the coincidence of the detected sync pulses and retrace pulses, increases the control voltage generating capability of the comparator when the receiver is in sync and reduces it when out of sync.

The present invention improves the pull-in performance of the horizontal deflection system by maintaining a sufficient amount of AGC action during out-of-sync conditions to insure an adequate supply of synchronizing pulses.

Accordingly, it is an object of the present invention to provide an improved AGC system for a television receiver.

It is another object of the present invention to provide an AGC system which improves the pull-in performance of the television receiver's horizontal deflection system.

BRIEF DESCRIPTION OF THE DRAWING

The features of the present invention which are believed to be novel are set forth with particularity in the appended claims. The invention, together with further objects and advantages thereof, may best be understood by reference to the following description in conjunction with the accompanying drawing in which like reference numerals identify like elements and in which:

DESCRIPTION OF THE PREFERRED EMBODIMENTS

Figures 1, 2:
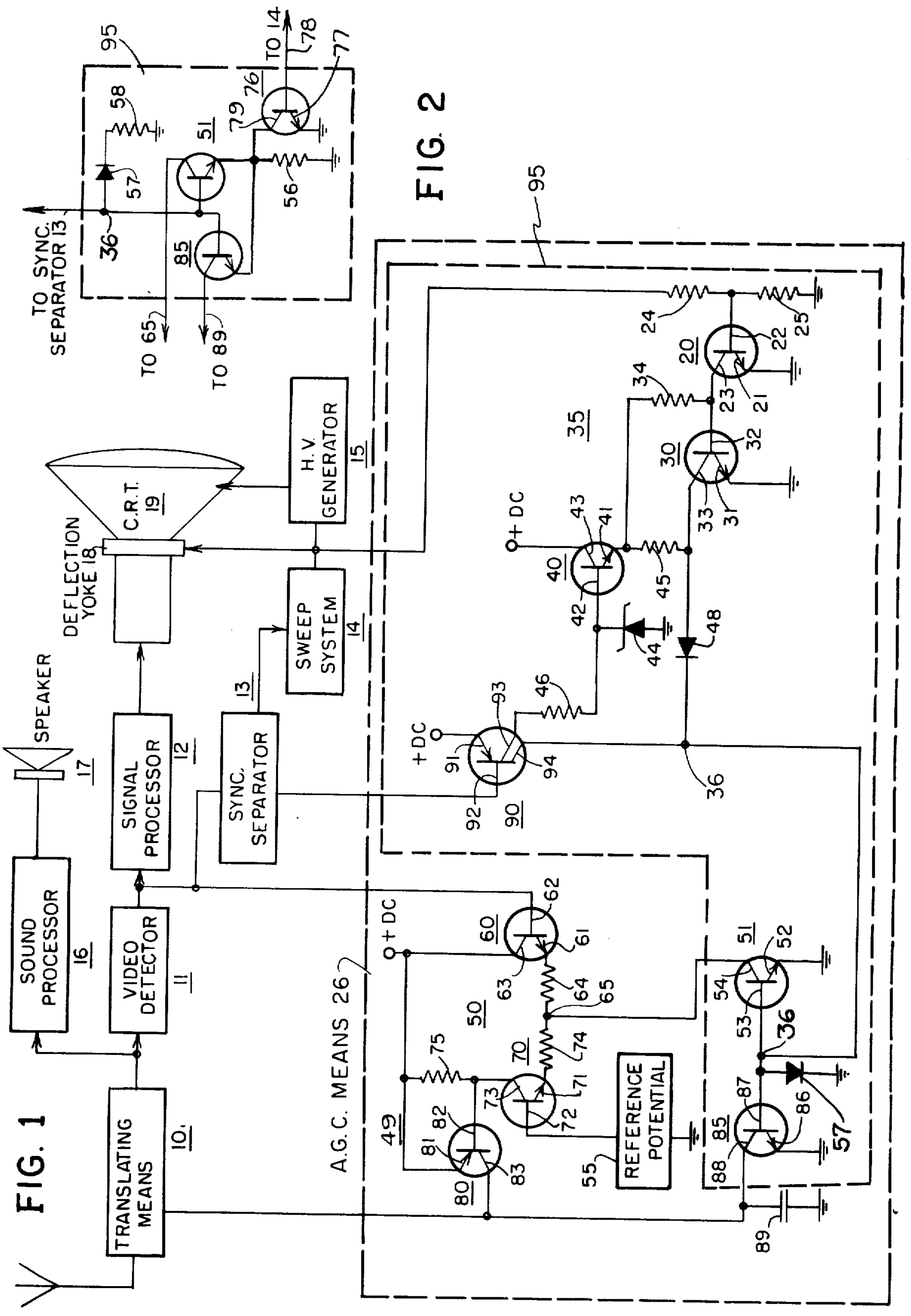
FIG. 1 is a partial block, partial schematic diagram of a television receiver incorporating the present invention.
FIG. 2 is a schematic diagram disclosing a very simple alternate embodiment of the circuitry in FIG. 1 incorporating the present invention.

FIG. 1 shows a television receiver employing the present invention. A translating means 10 is coupled to a video detector 11 and to the input of a sound processor 16, the output of which is connected to a speaker 17. The output of video detector 11 feeds a signal processor 12 and a sync separator 13. The output of signal processor 12 supplies a cathode ray or picture tube 19. A sweep system 14 is coupled to sync separator 13, a deflection yoke 18, mounted on the neck of cathode ray tube 19, and to a high voltage generator 15, the output voltage of which is supplied to tube 19.

An AGC means 26 includes a comparison means 49 and an operating means 95, which is indicated by the dashed line box. Comparison means 49 include a differential amplifier 50 having an output coupled to translating means 10 via a charge transistor 80. Operating means 95 include an AND gate 35, coupled between sweep system 14 and differential amplifier 50, and a dual collector PNP transistor 90 coupling sync separator 13 to differential amplifier 50.

AND gate 35 comprises an NPN transistor 20, with an emitter 21 connected to ground, a base 22 and a collector 23; an NPN transistor 30 having a grounded emitter 31, a base 32 and a collector 33; and an NPN transistor 40 with an emitter 41, a base 42 and a collector 43 connected to a source of positive DC potential +DC.

Series connected resistors 24 and 25 are connected between the output of sweep system 14 and ground, and their junction is connected to base 22. The collector of transistor 20 is connected to the base of transistor 30 and, through a resistor 34, to emitter 41 of transistor 40. Emitter 41 is also connected to collector 33 of transistor 30 through a resistor 45, and base 42 is returned to ground through a Zener diode 44. Collector 33 is further connected to the anode of an isolation diode 48, the cathode of which is connected to a junction terminal 36.

Dual collector PNP transistor 90 has an emitter 91 connected to +DC, a base 92 connected to sync separator 13, a first collector 93 and a second collector 94. Collector 93 is connected through a resistor 46, to the junction of Zener diode 44 and base 42 of transistor 40. Collector 94 is connected to terminal 36.

Differential amplifier 50 includes a pair of NPN type transistors 60 and 70. Transistor 60 has an emitter 61, a base 62 connected to video detector 11, and a collector 63 connected to +DC. Transistor 70 has an emitter 71, a base 72 connected to a source of reference potential 55, and a collector 73 connected, through a load resistor 75, to +DC. Emitters 61 and 71 are coupled by a series pair of resistors 64 and 74 forming a junction 65. Junction 65 feeds the collector 54 of an NPN sink transistor 51 which includes a grounded emitter 52 and a base 53 which is coupled to terminal 36. A reference diode 57 couples base 53 to ground. It will be seen that the differential amplifier current flows through the collector-emitter junction of sink transistor 51 and is, of course, affected by the impedance thereof.

An NPN discharge transistor 85 includes a grounded emitter 86, a base 87 connected to the base 53 of transistor 51 and thus to terminal 36, and a collector 88 connected to a "hold" capacitor 89. A PNP charge transistor 80 has its emitter 81 connected to +DC, its base 82 connected to collector 73 of transistor 70 and its collector 83 connected to hold capacitor 89 and to translating means 10.

Briefly, comparator means 49 include a differential amplifier 50 comparing the detected video signal with a reference potential 55 and developing an AGC voltage for gain controlling the translating means 10. The current available to the differential amplifier 50 is established by series connected sink transistor 51, the conduction level of which is varied in accordance with coincidence between the sync and retrace pulses. During coincidence, the sink transistor 51 is conducting a large amount of current and the differential amplifier current, and hence its output voltage for a given detected video-reference signal differential, is maximum. During non-coincidence, the sink transistor is partially conductive, thus reducing the output voltage of the differential amplifier, but not eliminating it. Consequently, even under non-coincident conditions, some AGC correction occurs which materially assists the pull-in of the horizontal oscillator system.

In more detail, a television signal containing modulated picture information, and reference information in the form of sync pulses, is received by translating means 10 which includes wellknown circuitry for converting the received signal to an intermediate frequency signal. The intermediate frequency signal is applied to video detector 11 where the modulated information is separated or detected and fed to signal processor 12 and sync separator 13. Sync separator 13 responds to the sync pulses in the detected video signal and supplies sync pulses to base 92 of dual collector transistor 90 and to sweep system 14. Signal processor 12, may in its simplest form be a video amplifier for amplifying the signal to a level sufficient to drive picture tube 19.

FIG. 1 may also represent an NTSC type color receiver. In that event signal processor 12 will include appropriate circuitry for, responding to the chrominance signal, reproducing the color subcarrier, detecting the color information and applying it to appropriate elements in picture tube 19. Sweep system 14 includes circuitry for generating both horizontal and vertical deflection signals for deflection yoke 18 to accomplish horizontal scanning of the picture tube. In a color system, deflection yoke 18 will be understood to include appropriate apparatus for supplying convergence correction fields for the electron beams generated by the electron guns (not shown) in tube 19. Sweep system 14 will, therefore, need to include appropriate well-known circuits for developing the proper convergence currents. Sweep system 14 also drives the high voltage generator which provides the high DC anode voltage for picture tube 19.

Sweep system 14 further includes a free-running oscillator having a nominal frequency near that of the horizontal synchronizing pulse frequency of the television signal. The oscillator frequency is locked to the sunc pulse frequency by circuitry responsive to the latter. The output of sweep system 14 includes a relatively long signal of increasing amplitude during the trace interval when the electron beams are scanned across the face of picture tube 19 and a relatively short high amplitude positive going retrace signal, or pulse, when the beams are returned to their positions at the beginning of scan. This retrace pulse occurs during the sync pulse interval and is supplied to the high voltage generator where it is amplified and rectified to produce the high voltage DC for the picture tube.

Differential amplifier 50 generates a control voltage for controlling the gain of translating means 10. Its control voltage generating capability, that is, the rate of change of the control voltage produced for a given differential between the detected video and the reference voltage is determined by the conduction level in sink transistor 51 and is greater during in-sync conditions than it is during out-of-sync conditions. The control voltage is stored in hold capacitor 89 by the combined actions of a discharge transistor 85 and charge transistor 80 which respond to the voltage pulse applied to junction 36 and the voltage output of differential amplifier 50, respectively.

Assume a positive pulse is applied to junction 36 (the source of which will be discussed later). Normally off sink transistor 51 and discharge transistor 85 conduct. Conduction of transistor 51, prohibited from reaching saturation by reference diode 57, reduces the impedance between junction 65 and ground and results in conduction of transistors 60 and 70 in differential amplifier 50. The relative conduction levels of transistors 60 and 70 are a function of the differential between the amplitude of the sync pulse in the detected video, applied to base 62 of transistor 60, and the reference potential 55, applied to base 72 of transistor 70. The total current through transistors 60 and 70 remains constant and is determined by the degree of conduction in transistor 51.

Conduction in transistor 70 develops a voltage across its load resistor 75 which turns on charging transistor 80, resulting in the charging of hold capacitor 89 over the path extending from +DC and the emitter-collector path of transistor 80. The simultaneous conduction of discharge transistor 85 completes a discharge path to ground for capacitor 89 through its collector-emitter path. Therefore, the voltage on capacitor 89 is a function of the relative conductions of transistors 80 and 85.

When the amplitude of the detected video signal is at the level established by reference potential 55, transistors 80 and 85 conduct equal currents and no change occurs in the voltage on hold capacitor 89, which is the automatic gain control voltage applied to translating means 10.

If the amplitude of the sync pulses in the detected video signal decreases, the conduction level of transistor 60 increases. Because of the nature of a differential amplifier, the conduction level of transistor 70 is thereby reduced as is the voltage drop across resistor 75. Conduction in transistor 80 is reduced, and the net charge on capacitor 89 decreases, thus reducing the gain control voltage and increasing the gain of the translating means.

Similarly, an increase in detected video signal level decreases conduction in transistor 60 and increases conduction in transistor 70, which is accompanied by an increase in charge on hold capacitor 89 and consequent reduction in gain of translating means 10. Thus, the control voltage produced by AGC means 26 is a function of the net current flow to capacitor 89. To provide the AGC means 26 with greater control voltage generating capability during in-sync conditions than it has during out-of-sync conditions, the magnitude of pulse applied to transistors 51 and 85 is changed as a function of coincidence between the sync and retrace pulses. A greater pulse is applied during in-sync conditions and a lesser pulse applied during out-of-sync conditions.

Operating means 95 in FIG. 1 includes AND gate 35 and dual collector transistor 90 in the coincidence circuitry. The negative sync pulses applied to the base of transistor 90 appear as amplified and inverted pulses on its dual collectors 93 and 94. A characteristic of transistor 90 is that the pulse output at collector 94 is much smaller than the pulse output at collector 93.

Upon occurrence of a sync pulse at transistor 90 during in-sync conditions, the larger positive pulse on collector 93, maintained at a consistent amplitude by Zener diode 44, is applied to base 42 and is coupled through the emitter-base junction of transistor 40, through resistor 45 and diode 48 to junction 36, where it drives sink transistor 51 into heavy conduction. This coupling occurs because the simultaneously applied retrace pulse at base 22 has driven normally off transistor 20 into saturation, thereby grounding the base of transistor 30 and keeping it nonconductive. When nonconductive, the collector-emitter impedance of transistor 30 is high and, as will be explained below, does not suppress the pulse from emitter 41. It should be noted that the smaller pulse on collector 94 is always coupled through to sink transistor 51, irrespective of coincidence between the sync pulses and retrace pulses.

Thus, the dual collectors of transistor 90 supply a large sync pulse to an input of the AND gate and a small sync pulse directly to sink transistor 51, thus bypassing the AND gate. A simultaneously occurring retrace pulse at the other input of AND gate 35 allows the large sync pulse to be added to the small sync pulse fed to the sink transistor for controlling the conduction level of the differential amplifier. In the absence of coincidence only the smaller sync pulse is supplied to the sink transistor 51, thus substantially diminishing the voltage generating capability of AGC means 26.

Specifically, AND gate 35 operates as follows. Transistor 20 is driven into saturation by the positive going retrace pulse applied to its base 22 via resistors 24 and 25. Saturation of transistor 20 results in effective grounding of its collector 23, which grounds base 32 of transistor 30 and maintains this transistor in a cut-off condition, irrespective of whether a positive going pulse is supplied from transistor 40. When transistor 30 is in cut-off, its collector-emitter impedance is high, thus enabling positive pulses on emitter 41 to be coupled through resistor 45 and diode 48 to junction 36. In the absence of a retrace pulse at the base of transistor 20, transistor 30 is driven into saturation by the positive pulse on emitter 41 of transistor 40 and the emitter-collector impedance of transistor 30 effectively grounds the junction of diode 48 and resistor 45 thus precluding coupling of the positive pulse through the diode to junction 36.

A very simple circuit for accomplishing the change in voltage generating capability of the AGC means as a function of coincidence is shown in FIG. 2. In FIG. 2 the operating means in dashed-line block 95 include discharge transistor 85 and sink transistor 51 connected in substantially the same manner as in FIG. 1 with the exception that their emitters are returned to ground through a resistor 56. Further, junction 36 (connected to the respective bases of these transistors) is fed directly from sync separator 13 which for this embodiment must produce a positive pulse output. A diode 57 and a resistor 58 connect this junction to ground to compensate for transistor variations. The retrace pulse from sweep system 14 is now applied to a base 78 of a transistor 76, the emitter-collector junction of which is connected across resistor 56. The circuit operates in substantially the same manner with respect to the sample and hold AGC action. However, rather than controlling the differential amplifier current by altering the impedance of the emitter-collector junction of sink transistor 51, the impedance from the emitter of sink transistor 51 to ground is varied. Resistor 56, in series with the differential amplifier 50 and sink transistor 51 causes reduced conduction of differential amplifier 50 during out-of-sync conditions. During in-sync conditions, transistor 76 is driven into saturation in response to the retrace pulses, which lowers its collector-emitter impedance and shorts out resistor 56 thereby increasing differential amplifier conduction.

What has been described are novel arrangements for enhancing the pull-in characteristics of a television receiver having a sample and hold AGC system. During non-synchronous operation, a reduced AGC control voltage generating capability is maintained to supply sync pulses to assist in developing AGC correction voltages. Under synchronous conditions, the sample and hold AGC system operates normally.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. A television receiver including signal translation means for receiving and translating television signals modulated with picture information and synchronizing pulse information, comprising:

a video detector, coupled to said signal translation means, recovering said modulated information;

a sync separator, coupled to said video detector, separating said synchronizing pulse information from said picture information;

a sweep system, coupled to said sync separator, generating sweep signals including retrace pulses;

AGC means, coupled to said video detector and to said sync separator and to said sweep system, generating a control voltage, representative of the video detector output level, and applying said control voltage to said signal translation means to control the gain thereof and maintain the video detector output at a predetermined level, the control voltage generating capability of said AGC means being variable; and means operating said AGC means at a greater control voltage generating capability during coincidence between said synchronizing pulses and said retrace pulses and at a lesser, but more than zero capability, during non-coincidence in response to said synchronizing pulses.

2. A television receiver as in claim 1, wherein said AGC means further includes:

a source providing a reference potential representative of said predetermined video detector output level; and comparison means generating said control voltage as a function of the differential between the magnitude of a synchronizing pulse and said reference potential, the change in the control voltage generating capability of said comparison means resulting in generation of a control voltage having a first magnitude for a given differential during said coincidence and a second substantially smaller magnitude for the same differential during non-coincidence.

3. A television receiver as in claim 2, wherein said means operating are coupled to said sweep system and said sync separator and determine the conduction level of said comparison means as a function of said coincidence.

4. A television receiver as in claim 3, wherein said comparison means includes:

a differential amplifier, coupled to said source of reference potential, said video detector, and said operating means, and having a pair of like polarity transistors so configured that their separate currents share a common conduction path;

said control voltage comprising the output voltage of said differential amplifier and the level of current in said common path determining said control voltage generating capability; and wherein said operating means includes variable impedance means, series connected in said common conduction path.

5. A television receiver as in claim 4, wherein said variable impedance means includes:

a variable impedance series connected in said common conduction path; and control means decreasing the impedance of said variable impedance to increase the current in said common conduction path during coincidence and increasing said impedance to decrease said current during non-coincidence.

6. A television receiver as in claim 5, wherein said variable impedance comprises:

a sink transistor having emitter and collector electrodes serially connected in said common conduction path and a base electrode, wherein said control means increases the relative voltage between said base and said emitter during said coincidence and decreases said relative voltage during said non-coincidence.

7. A television receiver as in claim 6, wherein said control means includes:

a dual collector transistor having an emitter electrode connected to a DC supply and a base electrode coupled to said sync separator;

an AND gate, having inputs coupled to said sweep system and to one of said dual collectors, generating an output signal only during said coincidence;

the other of said dual collectors coupled to said base of said sink transistor; and a diode coupling said AND gate output signal to said base of said sink transistor.

8. A television receiver as in claim 7, wherein said dual collector transistor has a greater signal gain from said base to said one of said dual collectors and a lesser signal gain from said base to said other of said dual collectors.

* * * * *